UNITED STATES PATENT OFFICE.

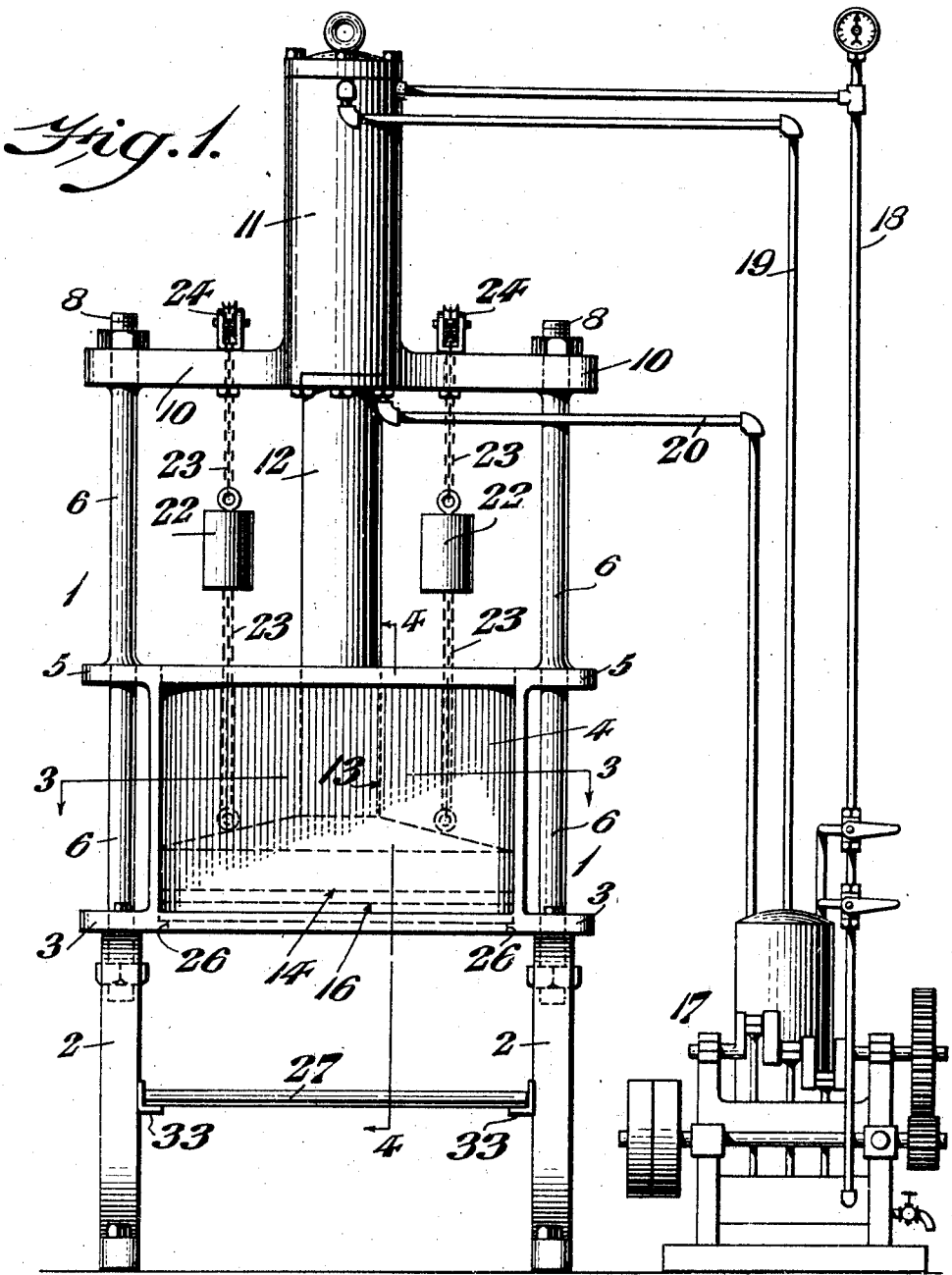

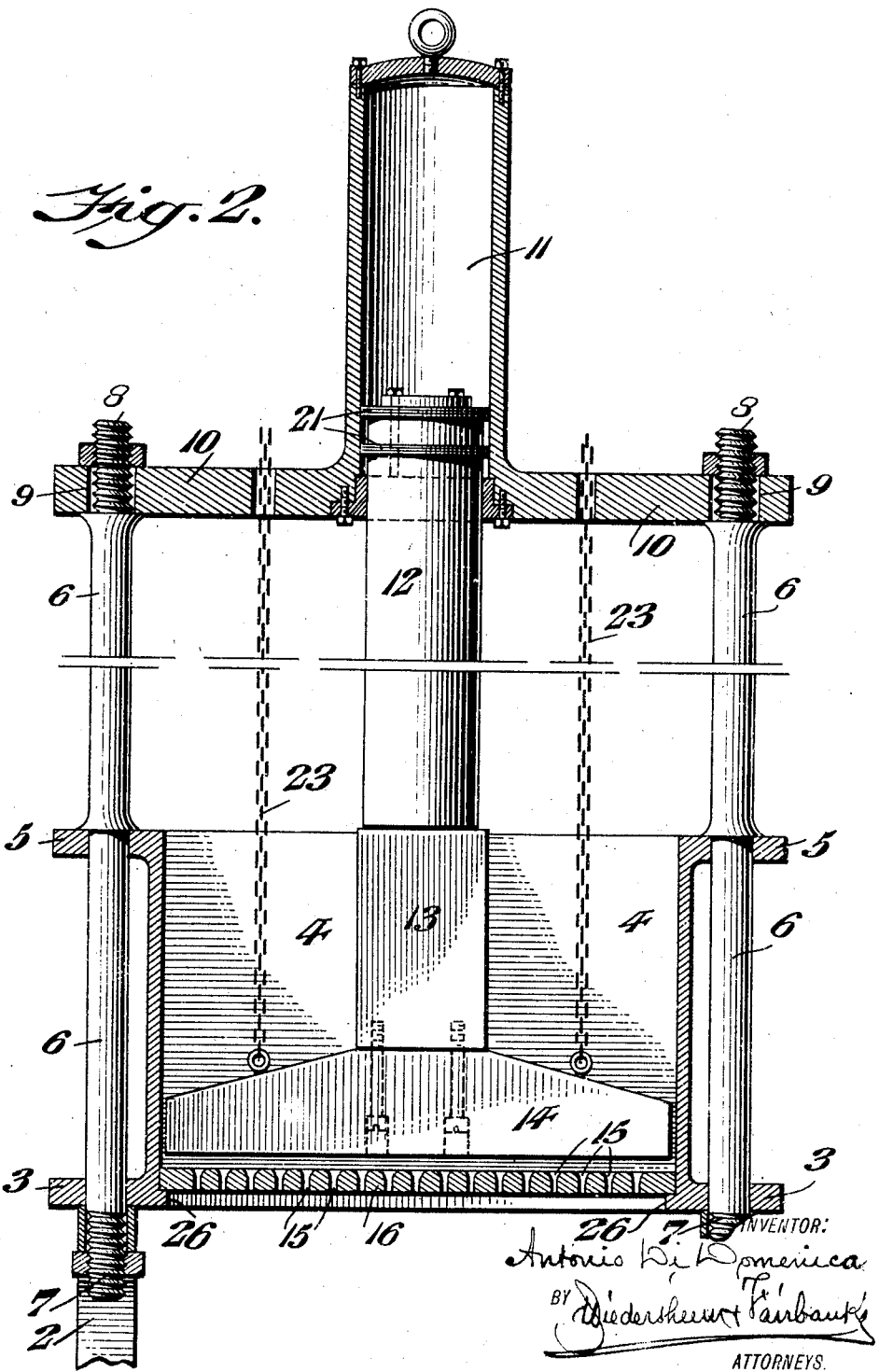

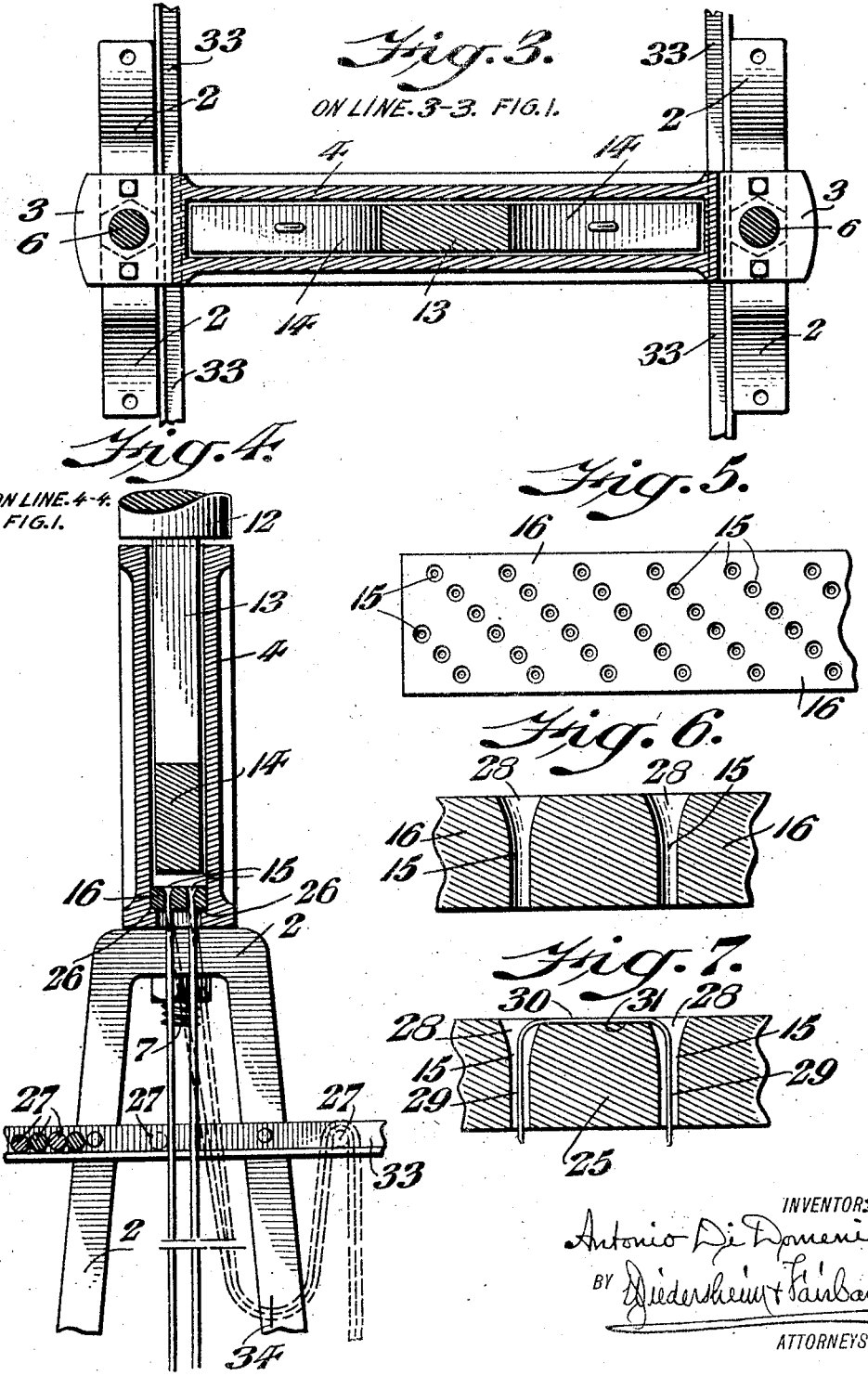

ANTONIO DI DOMENICA, OF PHILADELPHIA, PENNSYLVANIA.

MACHINE FOR MAKING MACARONI.

1,378,662.

Specification of Letters Patent.   Patented May 17, 1921.

Application filed January 10, 1920. Serial No. 350,516.

*To all whom it may concern:*

Be it known that I, ANTONIO DI DOMENICA, a subject of the King of Italy, having resided in the United States one year last past, and having declared my intention of becoming a citizen thereof, residing in the city and county of Philadelphia, State of Pennsylvania, have invented a new and useful Machine for Making Macaroni, of which the following is a specification.

My invention relates in general to the class of machine or presses which are employed in the art of expressing masses of edible material in the form of dough, such as macaroni into string-like forms, either solid or tubular, which with the dough forms a certain class of edible substance known to the trade as macaroni.

The object of my invention is the construction of an efficient, inexpensive and accurately operating press adapted for the formation either of solid or tubular edible or other bodies, formed from masses of plastic material, and in which provision is made for the easy conversion of the bottom of the trough member into one adapted for the formation of either solid or tubular bodies.

With the foregoing and other objects in view, my invention comprehends a machine of a special character and construction, a typical embodiment of which is represented in the accompanying drawings and hereinafter described, the special features of which I claim as novel being definitely set forth in the claims.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a side elevation of a macaroni machine and its adjuncts embodying a preferred form of my invention.

Fig. 2 represents in side sectional elevation such part of Fig. 1 as embraces the cylinder, the piston, the dough trough, the ram and the removable floor of the trough which constitutes a die.

Fig. 3 represents a horizontal section through the trough on the line 3—3 of Fig. 1.

Fig. 4 represents a transverse, sectional end elevation on the line 4—4 Fig. 1.

Fig. 5 represents a plan of a part of the die floor of the trough.

Fig. 6 represents an enlarged section of a part of the die floor, illustrating expulsion apertures or exit ports through it for the formation of solid products, and Fig. 7 represents a view similar to Fig. 6 when the apertures are formed with cores or mandrels to effect the production of tubular products.

Similar numerals of reference indicate corresponding parts.

Referring to the drawings:—

1 designates the frame-work of the machine, in the organization shown composed of a pair of standards 2 upon which rest the basal flanges 3 of a quadrangular or other shaped trough 4, within which is placed the dough to be compressed into the desired forms of, for instance, such a product as macaroni.

5 designates the upper flanges of the trough, which preferably correspond to the basal flanges 3 and through which vertical supporting rods 6 pass. Each of these rods is at the bottom threaded at 7 so as to be conveniently secured by nuts to the standards, and each of them is also threaded at the top as at 8, and passed through apertures 9 in a base plate 10 of a vertically disposed cylinder 11 within which operates the piston 12. As shown in Fig. 2, the base plate 10 and rods 6 are retained in fixed relation by means of a nut secured to the threaded end 8 of each of said rods. Secured to the lower end of piston 12 is a plate 13 to which is secured the ram or dough plunger 14, which conforms in exterior configuration and dimensions to the interior of the dough trough 4 and serves as the medium by the aid of which the dough or other plastic material is forced through apertures 15 in a removable die, floor or bottom 16, of the trough suitably supported on ledges 26 thereon, the dough in plastic condition then assuming the form of macaroni-like streams as it leaves the die 16.

In the organization under consideration, the piston is shown as operated by a hydraulic pump 17 of any preferred character, and such, for instance, as is typically illustrated in Fig. 1,—and from this pump lead into the upper part of the cylinder 11, a fluid feed conduit 18, a fluid exhaust or return conduit 19,—a leakage conduit 20, from the bottom of the cylinder, serving to return any leakage of the motive fluid which may pass the packings 21 on the upper end of the piston.

To effect the elevation or quick return of the piston and its plunger or ram, I provide a system of counter-balanced weights 22 which by a chain connection 23 passing over pulleys 24 erected upon base plate 10 of the cylinder, serve when the lead is given to the exhaust conduit 19 to effect the desired elevation.

25 designates another perforated or apertured removable die which forms the floor of the dough trough and which may be supported upon the aforesaid ledges 26, being preferably extensions of the basal flanges 3.

15, as stated, designates the expulsion passages or exit ports through the floor 16 and through which the dough is forced into its final form. These apertures are preferably enlarged or countersunk as at 28 at their upper openings through the upper surface of the floor, and vertically disposed so that the pressure upon the dough is vertically downward.

In the form of die represented in Fig. 6, the passages or apertures 15 are clear or unobstructed, while in the form of die represented in Fig. 7, they are each centrally or axially in part filled by a downwardly extending wire, former or core 29,—it being a convenient construction with legs to fill two apertures by the same wire by bending it over to form a supporting head portion 30, which preferably lies in a groove 31 extending between two apertures and formed in the top surface of the floor, and which insures the proper centering of the wires concentrically with relation to the axes of the apertures, or exit passages, said wires thus comprising cores to form tubular macaroni.

The operation of the machine is, of course, easily understood:—The dough, or other substance to be compressed into the tubular or solid forms desired, is first placed in a mass within the trough, the ram having been raised clear of the upper edges of the trough so as to permit of the entrance of the dough.

The desired floor die having been previously put in place within the trough, the pump is started and the lead through the feed conduit 18 given to the fluid, to force the downward movement of the piston against the resistance of the counter-weights 22. The extent of the movement is, of course, controllable from the pump, the downward stroke being adapted to expel substantially the entire contents of the trough. The extent of downward movement of the ram 14 may be limited by the contact of the shoulder at the bottom of the piston 12 with the top of the wall of the trough 4, as will be understood from Fig. 4.

When the contents have been expelled, the elevation of the ram and piston are secured by opening or giving the lead to the exhaust conduit 19, with the result that the counter-weights will by the action of gravity serve to raise the piston and ram until the latter has been caused to clear the upper edges of the trough, after which the operation can be repeated.

The operation broadly as such is the same without regard to whether the die floor with the clear apertures represented in Fig. 6 or the die floor with the core and hanger represented in Fig. 7, is used.

While the macaroni is formed it is deposited on the rods or sticks 27, the latter being supported on the horizontal ledges 33 which are attached to the sides of the standards 2, of course, below the die from which the macaroni is expelled, the macaroni being looped successively on said rods, which are brought forward beneath the shaped dough on the ledges 33 as required by the operator to form said dough into loops on the respective rods, and each loop being cut as at 34 when said rods 27 may then be removed from the ledges 33 and the macaroni thereon be directed elsewhere to be dried.

Having thus described my invention what I claim as new and desire to secure by Letters Patent, is:—

1. A machine of the character stated, comprising in combination, a frame-work, a trough therein, a removable apertured floor for said trough, a plunger within said trough, means for actuating said plunger, a plurality of cores for said apertured floor, each of which comprises a body portion extending between two of the above mentioned floor apertures, having its ends bent at substantially right angles and positioned axially within a pair of apertures, means for elevating said plunger, and means below said trough for receiving and supporting material expressed therefrom in loop-like form.

2. In a machine of the character stated, a frame, a dough receiving trough, an apertured floor in said trough, means for expressing the dough in a stream through the apertures in said floor, oppositely arranged ledges on said framework below said floor, and a plurality of movable members on said ledges adapted to have the stream of dough placed and held suspended therefrom in loop-like form.

3. In a machine of the character stated, a frame, a trough, an apertured floor in said trough, means for expressing dough through the apertures in said floor in a stream, ledges on said frame below said floor, and laterally movable rods on said ledges adapted to receive said stream and support the latter in loop-like form.

ANTONIO DI DOMENICA.

Winesses:
C. D. McVay,
M. E. Byrne.